(12) United States Patent
Wilcock et al.

(10) Patent No.: US 7,404,007 B2
(45) Date of Patent: Jul. 22, 2008

(54) SYSTEM FOR UPLOADING IMAGE DATA FROM A USER MOBILE DEVICE TO A NEARBY THIRD-PARTY MOBILE DEVICE BEFORE TRANSFERING TO A NETWORK STORAGE SERVICE DEVICE

(75) Inventors: Lawrence Wilcock, Malmesbury (GB); Paul St John Brittan, Claverham (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 1002 days.

(21) Appl. No.: 10/862,107

(22) Filed: Jun. 4, 2004

(65) Prior Publication Data

US 2004/0249905 A1    Dec. 9, 2004

(30) Foreign Application Priority Data

Jun. 4, 2003   (GB)   ................... 0312774.3

(51) Int. Cl.
*G06F 15/173*   (2006.01)

(52) U.S. Cl. .................. 709/238; 709/239; 709/218; 709/213; 709/214

(58) Field of Classification Search .......... 709/238, 709/239, 217, 218, 219, 213, 214, 216; 705/57; 358/1.15

See application file for complete search history.

(56) References Cited

U.S. PATENT DOCUMENTS

| | | | |
|---|---|---|---|
| 5,481,303 A | 1/1996 | Uehara | 348/231.1 |
| 5,917,542 A | 6/1999 | Moghadam et al. | 713/172 |
| 2002/0097433 A1 | 7/2002 | Chang et al. | 358/1.15 |
| 2003/0033254 A1* | 2/2003 | Tanaka | 705/57 |
| 2003/0041329 A1 | 2/2003 | Bassett | 725/105 |
| 2003/0179405 A1* | 9/2003 | Seto | 358/1.15 |
| 2003/0200278 A1* | 10/2003 | Youn et al. | 709/217 |
| 2004/0039797 A1* | 2/2004 | Simpson et al. | 709/219 |
| 2004/0111493 A1* | 6/2004 | Yamaguchi et al. | 709/219 |
| 2004/0210644 A1* | 10/2004 | Prust | 709/219 |

FOREIGN PATENT DOCUMENTS

| | | |
|---|---|---|
| EP | 0 936 808 A1 | 8/1999 |
| JP | 2002-335475 | 11/2002 |
| JP | 2003-110978 | 4/2003 |
| WO | 01/72043 A1 | 9/2001 |

* cited by examiner

*Primary Examiner*—Le Luu

(57) ABSTRACT

Image data generated at a first mobile device is transferred to a storage service that is accessible via a communications infrastructure and with which a first party associated with the first mobile entity is preferably registered. This transfer is effected via one or more nearby third-party mobile devices with the first mobile device initially transferring the image data and an identifier of itself to the or each nearby third-party mobile device by using, for example, a short-range wireless link. The or each third-party device is then responsible for directly or indirectly forwarding the image data and the first-party identifier over the communications infrastructure to the storage service where it is stored. In one preferred embodiment, a reward is credited to any party whose device has been used in the successful transfer of image data to the storage service on behalf of the first party.

43 Claims, 2 Drawing Sheets

SYSTEM FOR UPLOADING IMAGE DATA FROM A USER MOBILE DEVICE TO A NEARBY THIRD-PARTY MOBILE DEVICE BEFORE TRANSFERRING TO A NETWORK STORAGE SERVICE DEVICE

FIELD OF THE INVENTION

The present invention relates to the transfer of image data from a mobile entity to a storage service system connected to a communications infrastructure.

As used herein, the term "image data" is intended to cover any form of image data whether relating to still photographs or video or film clips and including both visible-light image data and infra-red image data; furthermore, other data, such as audio data, may or may not be associated with the image data.

BACKGROUND OF THE INVENTION

Conventional digital cameras are typically constrained by battery life and by image-data storage capacity. It is therefore not uncommon for a user to find that near the end of a day the digital camera has insufficient free image-data memory to take further images that present themselves. The user must then choose between missing the newly presented images or deleting stored image data to make room for new images.

There already exist a number of internet-connected image-data storage systems which permit registered users to store large amounts of image data for access by themselves (or others to whom they grant access). These storage service systems are typically web based and generally provide functionality enabling a user to organise their images as desired—in other words, the user is effectively provided with an on-line photo-album service.

Such on-line storage services would seem to offer digital camera users the possibility of circumventing the problem of limited local image-data memory by uploading the image data to the storage service whenever the local memory is low on free space. However, many digital cameras do not have the functionality necessary to connect to the storage service whilst mobile (this would typically require wireless connectivity via a communications infrastructure including a cellular Public Land Mobile Network, or a wireless LAN, connected to the internet). Furthermore, even if equipped with appropriate mobile communication means for connecting via the communications infrastructure to the storage service, the digital camera may well have low battery power levels at the same time as experiencing low available memory problems with the result that it is not possible to establish a reliable connection through the communications infrastructure to the storage service.

It is an object of the present invention to provide a flexible way of transferring image data from a mobile entity to a remote storage service.

SUMMARY OF THE INVENTION

According to one aspect of the present invention, there is provided a method of transferring image data from a first mobile entity of a first party to a storage service accessible via a communications infrastructure, the method comprising the steps of:
(a) transferring from the first mobile entity, otherwise than via said communications infrastructure, both said image data and identifiers of said storage service and said first party, to at least one nearby third-party mobile entity for storage thereat;
(b) subsequent to step (a), transferring both said image data and the first-party identifier over the communications infrastructure from a said at least one third-party mobile entity to said storage service as identified by the service identifier; and
(c) storing the image data at the storage service for access by the first party.

Advantageously, the transfer of image data from the first mobile entity is only effected following detection of low internal resources, the first mobile entity normally either storing the image data or transferring it itself to the storage service.

In one preferred embodiment, in step (a) the first mobile entity also transfers to the or each said third-party mobile entity a third-party identifier identifying a party associated with the second mobile entity concerned, a reward indicator, and a digital signature over a data set comprising the image data, the first-party identifier, the third-party identifier, and the reward indicator. In this case, the storage service, on receiving the data set and related digital signature from an entity, carries out the following checks (though not necessarily in the order given and with failure of a check potentially terminating the carrying out of the checks):

a check, based on said digital signature, that the data set has not been altered, a check that the party identified by the first-party identifier is registered with the service, a check that a party associated with the entity transferring the data set to the service is the party identified by the third-party identifier, a check that the image data in the data set has not already been received.

Upon all checks being passed, the storage service stores the image data for access by the first party and credits the third party with the reward indicated by the reward indicator.

According to another aspect of the present invention, there is provided a mobile entity associated with a first party and comprising:

camera functionality for generating image data, a memory for storing a first-party identifier identifying the first party and a service identifier identifying a storage service with which the first party is registered, and a transfer arrangement for transferring image data to at least one nearby third-party mobile entity for subsequent onward transfer, via a communications infrastructure, to said storage service, the transfer arrangement being arranged to communicate with the at least one nearby third-party mobile entity independently of the communications infrastructure to transfer thereto both said image data and said identifiers for storage at the third-party mobile entity.

According to a further aspect of the present invention, there is provided a storage service system for receiving and storing image data for registered users, the system comprising:

a communications interface for receiving from a sending party, over a communications infrastructure, image data and an associated first-party identifier identifying a first party different from said sending party;

a checking arrangement arranged to check that said first party is a registered user of the service system and that the image data has not already been stored for the first party, the image data only being accepted for storage if both these checks are passed; and an image-data store for storing accepted image data for access by the first party.

BRIEF DESCRIPTION OF THE DRAWINGS

Embodiments of the invention will now be described, by way of non-limiting example, with reference to the accompanying diagrammatic drawings, in which.

BEST MODE OF CARRYING OUT THE INVENTION

Figure 1:
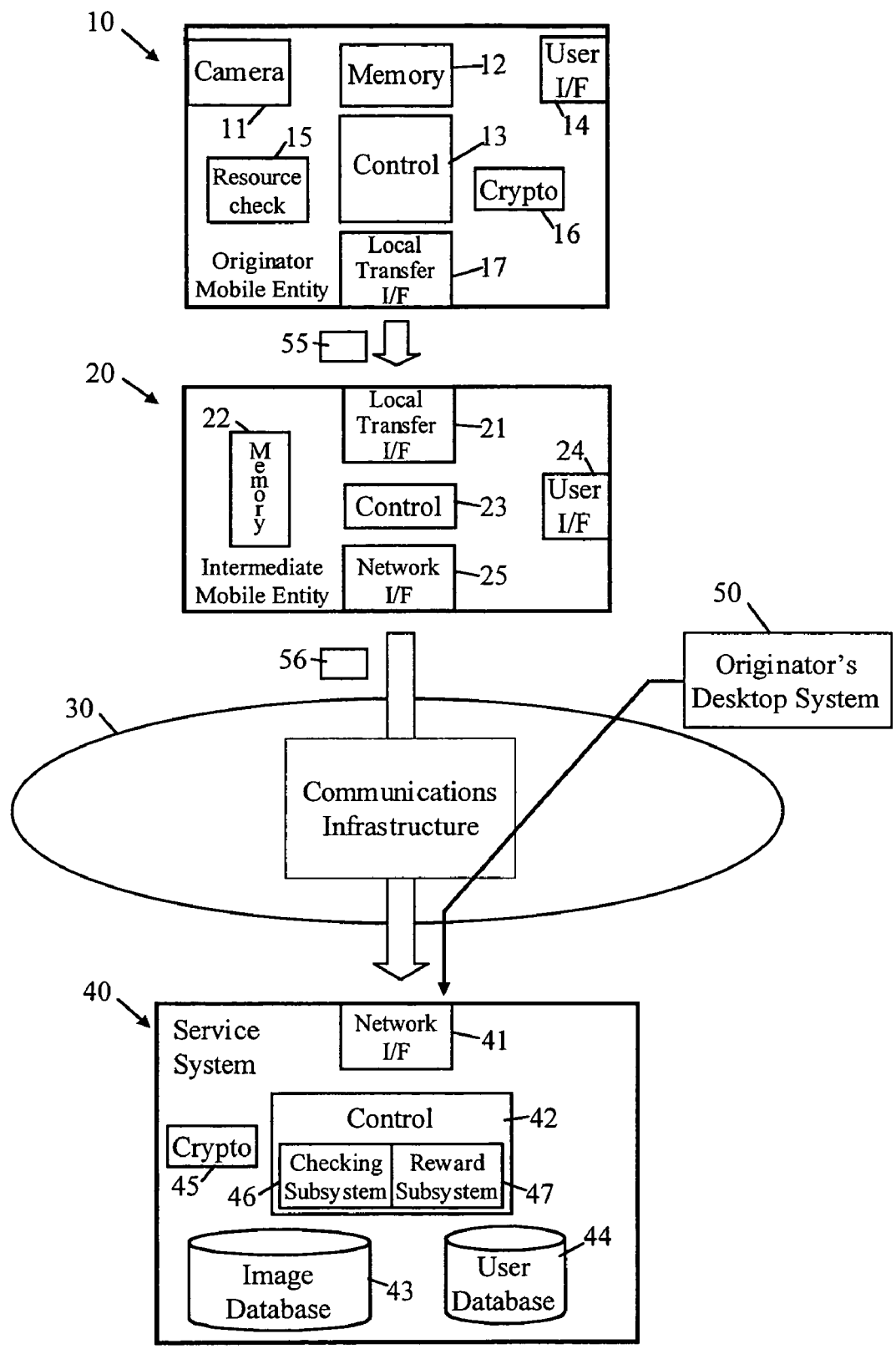
FIG. 1 is a diagram of an embodiment of the invention.

FIG. 1 depicts a first embodiment in which an originator mobile entity 10 is arranged to transfer image data to a single intermediate third-party mobile entity 20 for onward transfer, over a communications infrastructure 30, to an image-data storage service system 40 with which the party associated with the originator entity 10 (the originator party) is registered. In this example, the originator party can access his/her image data stored at the storage service system 40 using their desktop computer system 50 communicating via the communications infrastructure 30; of course, the originator party can use any other suitable internet-enabled display device or appliance, such as an internet-enabled picture frame to access the image data stored at the service system 40.

The communications infrastructure 30 can be of any suitable form and will typically comprise multiple interconnected networks of various types. For example, the service system 40 can be connected to the public internet with the intermediate mobile entity 20 being arranged to communicate with the internet via a PLMN (Public Land Mobile Network) or a wireless LAN (such as an 802.11 network) and the desktop computer system 50 being arranged to communicate with the internet via a wired LAN, the Public Switched Telephone Network, or a cable network.

The originator mobile entity 10 comprises camera functionality 11 for generating image data representing a viewed image, a memory block 12, a control block 13, a user interface 14, a resource-level detector 15, a cryptographic module 16, and a local transfer interface 17. Typically, the entity 10 will be built around a general purpose processor suitably programmed to provide the processing functions of the foregoing component elements of the entity, though the cryptographic module 16 may be at least partially implemented in specialized hardware.

The originator mobile entity 10 is arranged to operate in two modes, namely a first, or normal, mode and a second, or "low local resource", mode. The control block 13 is arranged to automatically switch operation between these modes in dependence on the amount of memory available in memory block 12 for the storage of image data as detected by the resource-level detector 15. Initially, with no image data stored in the memory block 12, the entity is in its normal operating mode; in this mode, when a picture is taken using the camera functionality 11, the image data that is generated is stored in the memory block 12 under the control of the control block 13. The entity will remain in its normal mode until the detector 15 determines that the amount of free image-data memory in memory block 12 has fallen below a predetermined first threshold value (corresponding for example, to twenty images having been stored in the memory block 12); when the free image-data memory falls below the first threshold, the control block 13 puts the entity into its second operating mode. In its second mode the entity will attempt to transfer image data via a nearby intermediate entity 20 to the storage service system 40; the image data that is transferred in this way can be that associated with the next image taken by the camera functionality 11 or it can be image data that is already held in the memory block 12 at the time the second mode is entered (this being preferred). The amount of image data sought to be transferred (preferably taken in whole image chunks) can be any amount up to and including all the currently-stored image data.

The first memory threshold value at which the entity changes from its first, normal, mode to its second, low-memory, mode is preferably such that there remains space in the memory block 12 for at least one further image to be stored so that if it is not possible to transfer any image data from the entity 10, via a nearby intermediate entity 20, to the storage service system, the originator party can still capture at least one more image without having to delete previously captured image data. The originator party is, of course, preferably warned visually or audibly when the entity 10 switches to its second operating mode. The entity 10 is arranged to return to its first, normal, operating mode when the detector 15 determines that the amount of free image-data memory in memory block 12 has risen above a second threshold value. This second threshold value may be the same as the first threshold value but is preferably somewhat greater, giving a hysteresis effect.

The entity 10 can be arranged to enable the originator party to override the automatic mode-switching operation effected by the control block 13. For example, before the entity switches into its second mode, the originator party can be asked to confirm, via the user interface 14, that this switch is to be permitted (the party may not wish to enter the second mode as he/she does not want to send any image data to the storage service system). As another example, the originator party can be enabled to set the entity 10 into its second mode at any time and specify what images are to be transferred via any nearby intermediate entity 20 to the service system 40.

Image data stored in the memory block 12 and not transferred via the intermediate entity 20 to the service system 40, is subsequently transferred to the latter using the originating party's desktop computer system 50 as is conventional. Thus, the image data in memory block 12 is first uploaded via the local transfer interface 17 into the computer system 50 from where it is transferred over the communications infrastructure 30 to the storage service system 40. The local transfer interface may take any suitable form such as a short range wireless connection (for example, a Bluetooth radio connection, an infrared link, or other peer-to-peer wireless connection), a wired interface such as a USB or "Firewire" (IEEE 1394) interface, or a memory card interface in which case the memory block 12 takes the form of a memory card that can be unplugged from the entity 10 and plugged into a suitable interface connector of the computer system 50.

Having described the general operation of the mobile entity 10, a more detailed consideration will now be given of how the entity 10, operating in its second mode, transfers image data via the intermediate entity 20 to the storage service system 40. This transfer is effected by a transfer arrangement comprising the relevant functionality of the elements 13 to 17.

In the following, it is assumed that the entity 10 on entering its second operating mode, seeks to transfer to the storage system image data already held in the memory block 12 in respect of a single image (for example, the first image stored or an image selected by the originator party) though as indicated above, the entity 10 may respond in other ways to entering its second operating mode.

On the entity 10 entering its second operating mode, an attempt is made to contact any nearby mobile entity with a request for the latter to act as an intermediate entity 20 for forwarding image data to the service system 40. The form of this request will depend on the form of the local transfer interface and in the following it will be assumed that the interface 17 is provided by a short-range wireless system such as a Bluetooth system. In this case, the control block 13 instructs the interface 17 to periodically send out a request message until a reply is received from a nearby entity 20 indicating its willingness to participate in a transfer of data to the service system 40. A negotiation phase is then entered in which the nearby mobile entity negotiates a price (or other reward) for transferring the image data to the service system. The entity 20 may, for example, demand a reward of a value dependent on the amount of currently-free memory it has (the less the available memory, the higher the reward sought) and on its connection costs to the communications infrastructure 30. Alternatively, there may exist a standard reward value for all transfers or a sliding scale of reward values depending on how quickly the entity 20 completes the transfer to the service system 40 (the shorter the delay, the greater the reward value). Once a reward value has been agreed, the originator mobile entity 10 composes a data package 55 which it transfers to the nearby mobile entity 20, this data package comprising the following components:

- a service identifier identifying the service system 40 (for example, by its IP address or URL);
- a first-party identifier identifying the originator party and recognisable by the service system (this could be a user name of the party with the service system or could potentially be an identifier of the entity 10 which the system 40 knows is associated with the originator party);
- a third-party identifier identifying a party associated with the nearby third-party mobile entity 20, this identifier having been supplied to the entity 10 by the entity 20;
- the image data;
- a reward indicator indicating the value of the agreed reward; and
- a digital signature formed over the data set comprising the first and third party identifiers, the image data, and the reward indicator.

An image identifier identifying the image to which the image data relates may also be included in the data package 55 and may, for example, comprise a hash of the image data or a serial number generated by the control block 13. Where the image identifier is included in the data package, it preferably forms part of the data set across which the digital signature is formed. The digital signature is formed by the cryptographic module 16 using a private key of a public/private key pair associated with the originator party to sign a hash of the data set; the public key of the key pair is reliably known or ascertainable by the service system (preferably, the key pair was generated by the latter).

The image data can be included in the data package 55 either in clear or in encrypted form; in the latter case, encryption is carried out by the cryptographic module 16 using, for example, a symmetric key known only to the mobile entity 10 and the service system 40.

The intermediate mobile entity 20 comprises a local transfer interface 21 compatible with the interface 17 of the entity 10, a memory block 22, a control block 23, a user interface 24, and a network interface 25 for interfacing the entity 20 with the communications infrastructure. The network interface is, for example, a data interface providing access to a GPRS (General Packet Radio System) network of a GSM PLMN. Typically, the entity 20 like the entity 10, will be built around a general purpose processor suitably programmed to provide the processing functions of the foregoing component elements of the entity 20.

Communication between the intermediate entity 20 and the originator entity 10 is effected via the interface 21 of the entity 20. The control block 23 is responsible for responding to the initial request received from the entity 10 and for negotiating the value of the reward with which the entity 20 (or, rather, the party associated with the entity 20) is to be credited for transferring image data on behalf of the originator entity 10 to the service system. After the reward value has been agreed and the identity of the entity 20 has been passed to the entity 10, the entity 20 receives the aforesaid data package 55 from the entity 10. The control block causes this data package 55 to be temporarily stored in the memory block 22.

After the data package 55 has been received and stored in full, the control block 23 first checks that the third-party identifier and the reward indicator included in the data package are as expected. Provided this check is passed, the control block 23 then causes communication to be established, either straight away or at some future time, via the network interface 25 and the communications infrastructure 30 with the storage service system 40 as identified by the service identifier included in the data package 55.

The storage service system comprises a network interface 41 for interfacing with the communications infrastructure 30, a control block 42, an image database 43, a user database 44 holding details of registered users (including their respective identifiers and cryptographic keys), and a cryptographic module 45. The control block 42 will generally take the form of a programmed general purpose computer whilst the cryptographic module 45 may either be implemented in software on the same computer or use specialised hardware to increase throughput. The image database 43 is arranged to store image data of multiple registered users with the control block 42 ensuring that a registered user (and possibly also other parties designated by the user or to whom the user has given access codes) can only access their own image data.

Upon the intermediate entity 20 making contact with the service system 40, the intermediate entity 20 first passes the latter the first-party identifier it received from entity 10 in the data package 55; if the data package included an image identifier, this is also passed to the service system. The control block 42 of the service system 40 first checks that the first-party identifier corresponds to a registered user and, if provided with the image identifier, then checks that the image has not already been received and stored in the image database 43 (to this end, each image that is stored in the database 43 is stored along with its associated image identifier). Provided the or each of these initial checks are passed, the control block 42 accepts the transfer of a reduced data package 56 (the data package 55 less the service identifier) from the entity 20 to the service system 40. It may be noted that the initial checks are not secure checks in that the entity 20 could have provided the service system with false data. However, the initial checks are carried out simply to minimise transfers that are obviously not useful.

Once the data package 56 has been received by the service system, it is temporarily stored pending the carrying out of a number of checks—only if all these checks (the "main" checks) are passed does the image data included in the data package 56 get stored in the image database 43 for the originator party to access. The main checks, as well as the aforesaid initial checks, are carried out by check functionality 46 of the control block 42. The main checks comprise the following checks (though not necessarily effected in the order given and with failure of a check potentially terminating the carrying out of the checks):

A check, based on the digital signature included in the data package 56, that the data set (comprising the first-party identifier, the third-party identifier, the image data, the reward indicator, and where provided, the image identifier) has not been altered. This check involves taking the first-party identifier included in the received data package and using it to retrieve, from the user database 44, the public key of the public/private key pair associated with the user corresponding to the first-party identifier. If this check is passed (that is, a hash of the data set matches the value produced by decrypting the digital signature), the service system 40 trusts that the data set of the package 56 contains, unaltered, data provided by the originator party (as identified by the first-party identifier).

A check that the party identified by the first-party identifier is registered with the service (this is a repeat of one of the initial checks but now in respect of trusted data for the first-party identifier). This check is effectively incorporated in the preceding check since if the first-party identifier does not identify a registered user, or identifies the wrong registered user, it will either not be possible to carry out the first check or the check will not be passed.

A check that the party associated with the entity transferring the data set to the service system is the party identified by the third-party identifier. This involves the service system authenticating the entity concerned in any appropriate manner—for example, this authentication can be based on a standard challenge/response mechanism in which the challenged entity is passed a nonce (random number) encrypted with the public key of a public/private key pair of the party identified by the third-party identifier, the challenged entity being required to return the nonce in decrypted form which is only possible if the entity has the corresponding private key. Weaker forms of authentication can alternatively be used. The purpose of carrying out this check is to ensure that only the third party to whom the originator party initially passed the image data can benefit from the reward on offer for assisting in the transfer of the data to the service system. In fact, as will be discussed below, this check can be omitted.

A check that the image data in the data set has not already been received. Where the data set includes an image identifier, then this check simply involves checking this identifier against the image identifiers of images already held for the originator party in the database 43; this check may simply be repeating one of the initial checks but with trusted data. Where the data set does not include an image identifier, this check involves forming a hash of the image data contained in the data set, and comparing this value against hash values for the images already stored for the originator party in database 43 (the hash values of the stored images are preferably not recalculated each time but are stored in database 43 along with the corresponding image).

Provided all of the foregoing checks are successfully passed, the control block 42 now causes the image data to be stored in the database 43 (along with the image identifier and/or the image hash) in the collection of images associated with the originator party. If the image data was encrypted by the originator entity 10, then the service system 40 uses its cryptographic module 45 to decrypt the image data before storing it in the database 43 (where the image data was encrypted using a symmetric key known only to the service system and the originator party, then this key is retrieved for use by the module 45 from the user database 44).

Successful storage of the image data causes a reward subsystem 47 of the control block 42 to credit the party identified by the third-party identifier with the reward indicated by the data-set reward indicator. The crediting of this reward may be recorded in a local database of the service system 40 or may be recorded in another system specified by the entity 20 (such as that party's bank).

Many variations are possible to the above-described embodiment. For example, the entity 10 can be provided with a network interface, similar to the interface 25 of the entity 20, that normally permits the entity 10 to transfer image data itself via the communications infrastructure 30 to the service storage system 40 either on user command or automatically when the available memory for image storage in memory block 12 becomes low. Such a direct transfer operation is something that occurs whilst the entity 10 is in its aforesaid first operating mode—in other words, detection of a low free memory condition by the detector 15 is no longer taken by the control block 12 as an automatic trigger for moving to the second operating mode; instead, the control block will first try to transfer image data directly to the service system. Only if such a transfer proves not to be possible for any reason does the control block 12 switch the entity 10 to operate in its second mode. One reason why it may not be possible to directly transfer image data to the service system 40 is that, in the case of the network interface being a radio interface, the mobile entity is beyond the normal operating range of the network interface from the communications infrastructure; another reason is that the state of charge of the battery used to power the entity 10 has fallen to a level that there is no longer adequate power to use the network interface. Indeed, the resource-level detector 15 can be arranged to monitor battery level as well as free memory amount, the control block then switching the entity into its second mode when free memory and battery charge state are both low. In fact, the control block can be arranged to switch the entity to its second operating mode simply on the basis of the battery charge state becoming low regardless of the amount of memory available, as this may represent the last opportunity to transfer image data from the entity before there is insufficient power to effect such a transfer.

Switching to the second operating mode can also be arranged to occur automatically at preset times to ensure a timely transfer of stored image data off the mobile entity 10.

As already indicated, the local transfer interface 17 of the entity 10 may be a wired connection interface in which case contacting a nearby mobile entity 20 will involve the originator party making personal contact with the party using the nearby entity 20 to get permission for connecting together the entities 10 and 20 to effect the image transfer. In this case, the reward value can be directly negotiated between the parties or carried out automatically as described above. Where the interface 17 is a memory card interface (the memory block 12 being a memory card), there will typically be little scope for negotiation between the entities 10 and 20 or for the control block 12 to compose the data package 55 incorporating data supplied by the entity 20 (in theory, this could be done by the back and forth transfer of the memory card between the entities 10 and 20 but in reality this is likely to be considered impractical from a usability standpoint). Therefore, where the interface 17 is a memory card interface, the data package 55 is likely not to include the third-party identifier and the reward indicator will either be a standard value or a value set in via the user interface 14. The data package 55 is, of course, composed by the control block 13 and stored to the memory block 12 before the memory card is removed from the entity 10 and inserted into the entity 20.

Rather than the entity 10 transferring the image data to a single nearby intermediate entity 20, the entity 10 can transfer the image data to multiple nearby intermediate entities thereby increasing the likelihood of a successful transfer to the service system. The same reward can be specified for each entity 20 or individually negotiated with each entity 20. Since the service system is set up to accept the image data only once, there is an incentive for the intermediate entities to contact the service system 40 as soon as possible; the service system 40 will handle each entity that contacts it in order of contact and will only reward the first intermediate entity 20 to successfully transfer the image data to it.

Figure 2:
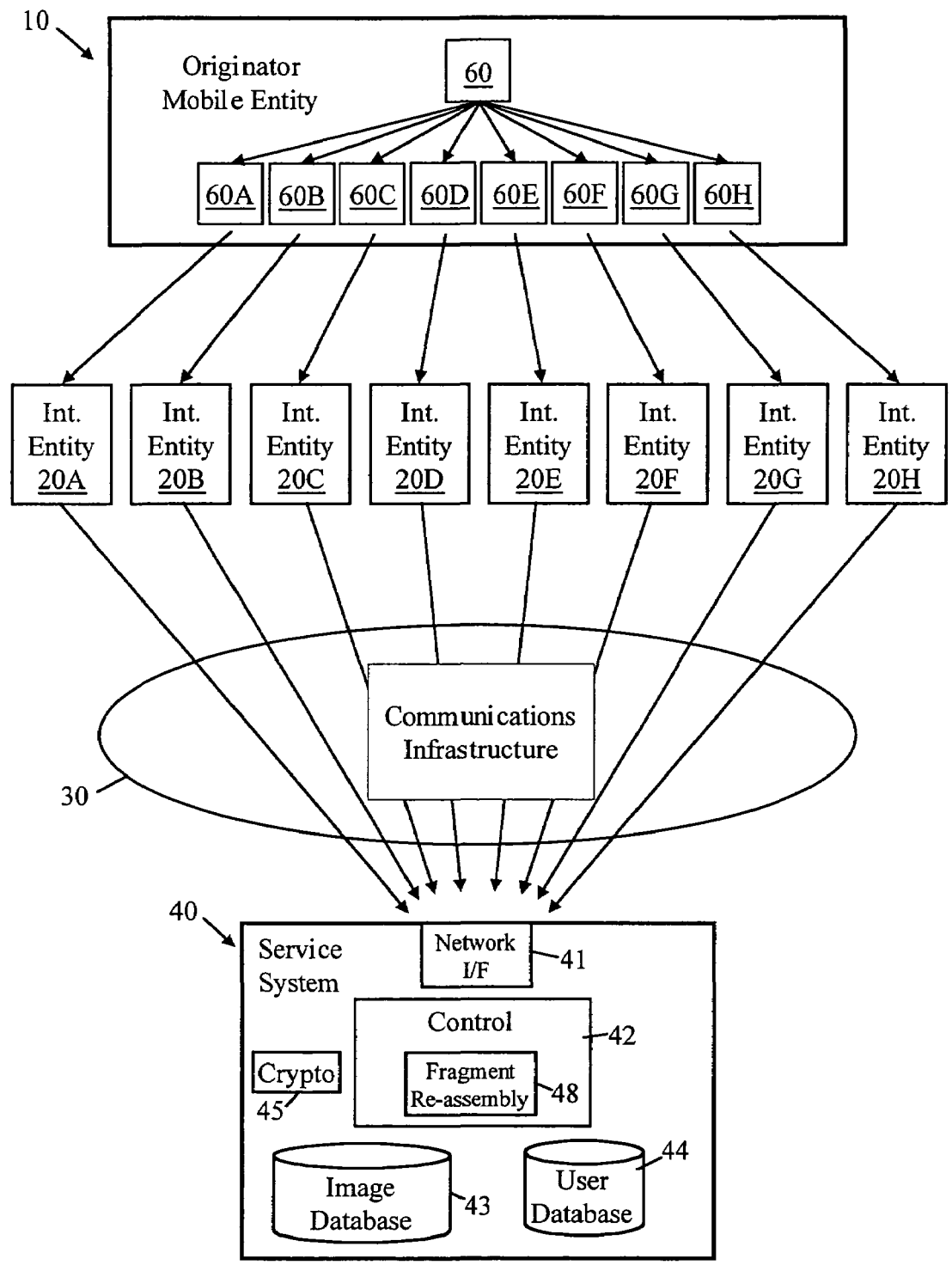
FIG. 2 is a diagram of a variant of the FIG. 1 embodiment.

Rather than using encryption to protect the confidentiality of the image data, the image data 60 (see FIG. 2) of an image can be split into multiple fragments 60A to 60H by the control block 12 of the entity 10 and each fragment then transferred via a different respective intermediate entity 20A to 20H to the service system 40. In this case, each fragment is treated in the same way as the whole image data in the FIG. 1 embodiment with the exception that each fragment has associated meta data for enabling it to be recombined correctly with the other fragments to reconstitute the image concerned. The recombination of the image fragments is the responsibility of a fragment re-assembly subsystem 48 of the control block 42 of the service system 40. Preferably, each fragment does not correspond directly to any particular portion of the fragmented image but is a respective predetermined selection of bits of the image data with this selection itself producing no sensible image. Of course, if desired, each fragment could itself be encrypted for extra security.

It is also possible to transfer each fragment to each of multiple intermediate entities 20, preferably with no overlap with entities 20 handling other fragments of the same image.

As regards the onward transfer of the reduced data package 56 to the service system 40, the (or each) intermediate entity 20 need not do this directly itself but can be arranged to upload the image data to another system, such as a desktop system, for transfer via the communications infrastructure 30 to the service system. In this case, where the service system authenticates the sending entity as being associated with the party identified by the third-party identifier, care should be taken to ensure that the desktop system constituting the sending entity authenticates itself with the same party identity as the entity 20 supplied to the entity 10 for inclusion in the third-party identifier.

As regards the contents of the data package 55, it will be appreciated that the reward indicator can be omitted if either no reward is to be credited or the reward value is always the same amount. Furthermore, the third-party identifier can be omitted though its presence may be demanded by the intermediate entity 20 concerned since it provides protection against a third party intercepting the data package 56 who then passes it on to the service system 40 to claim the reward. This protection is afforded by the third-party identifier even if the service system 40 does not check that the party sending it the package 56 is the same as the party identified in the third-party identifier, since the service system is arranged to credit the reward to the party identified in the third-party identifier.

At a minimum, the data package 55 needs to include, in addition to the image data, the service identifier to enable the intermediate entity 20 to contact the service system 40, and the first-party identifier to enable the service system to store the image data against the correct party in its database 43. Preferably, the data package 55 also includes a digital signature across these components but this is not essential.

The data packages 55 and 56 can, of course, include components additional to those mentioned above with any one or more of these components forming part of the data set across which the digital signature is formed.

Whilst the originator party will generally need to be pre-registered with the service system, it is also possible to provide for the first attempted transfer of image data to the service system to serve as a registration request with the service system reacting accordingly to accept or reject the request depending on any checks it decides to carry out with respect to the originator party.

The invention claimed is:

1. A method of transferring image data from a first mobile entity of a first party to a storage service accessible via a communications infrastructure, the method comprising the steps of:
   (a) transferring from the first mobile entity, otherwise than via said communications infrastructure, both said image data and identifiers of said storage service and said first party, to at least one nearby third-party mobile entity for storage thereat;
   (b) subsequent to step (a), transferring both said image data and the first-party identifier over the communications infrastructure from a said at least one third-party mobile entity to said storage service as identified by the service identifier; and
   (c) storing the image data at the storage service for access by the first party.

2. A method according to claim 1, wherein in step (a) all the image data associated with one image is transferred to a single third-party mobile entity.

3. A method according to claim 1, wherein in step (a) all the image data associated with one image is transferred to each of multiple third-party mobile entities.

4. A method according to claim 1, wherein in step (a) the image data associated with one image is divided into multiple fragments and each fragment is transferred to a single respective third-party mobile entity along with fragment meta data for facilitating fragment re-assembly.

5. A method according to claim 4, wherein the fragments are encrypted such that all said fragments are needed to be able to decrypt them.

6. A method according to claim 1, wherein in step (a) the image data associated with one image is divided into multiple fragments and each fragment is transferred, along with fragment meta data for facilitating fragment re-assembly, to each of multiple third-party mobile entities.

7. A method according to claim 6, wherein the fragments are encrypted such that all said fragments are needed to be able to decrypt them.

8. A method according to claim 1, wherein following a successful transfer to the storage service of image data via a said at least one third-party mobile entity, the storage service credits a party associated with that entity with a reward.

9. A method according to claim 8, wherein the first mobile entity associates, in a subversion-resistant manner, an indication of said reward with the image data transferred to the or each third-party mobile entity, the storage service using this indication to determine the reward to be credited.

10. A method according to claim 9, wherein said reward is negotiated automatically between the first mobile entity and the or each third-party mobile entity prior to step (a) being effected.

11. A method according to claim 8, wherein with the image data transferred to the or each third-party mobile entity, the first mobile entity associates, in a subversion-resistant manner, an identifier of a party associated with the third-party entity concerned; the storage service using this identifier for determining the party to be credited with the reward for a said successful transfer.

12. A method according to claim 1, wherein with the image data transferred to the or each third-party mobile entity, the first mobile entity associates, in a subversion-resistant manner, a third-party identifier identifying a party associated with the third-party entity concerned, the storage service only accepting image data transfer after authenticating that the entity wishing to make the transfer is associated with the party identified by the third-party identifier.

13. A method according to claim 1, wherein in step (b) the storage service only accepts transfer of the image data, or any particular fragment of it, if not already received.

14. A method according to claim 1, wherein the first mobile entity normally stores the image data or transfers it itself to the storage service but has been enabled to carry out step (a) following detection of low internal resources.

15. A method according to claim 14, wherein the first mobile entity normally stores image data in a local image-data memory but has been enabled to carry out step (a) upon the available space in its image-data memory being detected as below a predetermined level.

16. A method according to claim 14, wherein the first mobile entity has communication means capable, at least at normal battery power levels of the entity, of communicating with the storage service over the communications infrastructure, the first mobile entity having been enabled to carry out step (a) upon the power level of its battery being detected as below a predetermined value.

17. A method according to claim 14, wherein the first mobile entity normally stores image data in a local image-data memory and has communication means capable, at least at normal battery power levels of the entity, of communicating with the storage service over the communications infrastructure; the first mobile entity responding to the available space in its image-data memory being detected as below a predetermined level by attempting to use its communication means to transfer image data to the service system unless the first entity's battery power level is detected as below a predetermined value in which case the first entity is enabled to carry out step (a).

18. A method according to claim 1, wherein in step (a) the first mobile entity further transfers to the or each said third-party mobile entity a third-party identifier identifying a third party associated with the third-party mobile entity concerned, a reward indicator, and a digital signature over a data set comprising the image data, the first-party identifier, the third-party identifier, and the reward indicator; the storage service, on receiving the data set and related digital signature from an entity, carrying out the following checks though not necessarily in the order given and with failure of a check potentially terminating the carrying out of the checks:

a check, based on said digital signature, that the data set has not been altered, a check that the party identified by the first-party identifier is registered with the service, a check that a party associated with the entity transferring the data set to the service is the party identified by the third-party identifier, a check that the image data in the data set has not already been received, the storage service, consequent upon all checks being passed, storing the image data for access by the first party and credits the third party with the reward indicated by the reward indicator.

19. A mobile entity associated with a first party and comprising:

camera functionality for generating image data, a memory for storing a first-party identifier identifying the first party and a service identifier identifying a storage service with which the first party is registered, and a transfer arrangement for transferring image data to at least one nearby third-party mobile entity for subsequent onward transfer, via a communications infrastructure, to said storage service, the transfer arrangement being arranged to communicate with the at least one nearby third-party mobile entity independently of the communications infrastructure to transfer thereto both said image data and said identifiers for storage at the third-party mobile entity.

20. A mobile entity according to claim 19, wherein the transfer arrangement is arranged to transfer all the image data associated with one image to a single third-party mobile entity.

21. A mobile entity according to claim 19, wherein the transfer arrangement is arranged to transfer all the image data associated with one image to each of multiple third-party mobile entities.

22. A mobile entity according to claim 19, wherein the transfer arrangement is arranged to divide the image data associated with one image into multiple fragments and to transfer each fragment to a single respective third-party mobile entity.

23. A mobile entity according to claim 22, wherein the transfer arrangement includes encryption functionality for encrypting the fragments such that all said fragments are needed to be able to decrypt them.

24. A mobile entity according to claim 19, wherein the transfer arrangement is arranged to divide the image data associated with one image into multiple fragments and to transfer each fragment to each of multiple third-party mobile entities.

25. A mobile entity according to claim 24, wherein the transfer arrangement includes encryption functionality for encrypting the fragments such that all said fragments are needed to be able to decrypt them.

26. A mobile entity according to claim 19, wherein the transfer arrangement is arranged to associate, in a subversion-resistant manner, a reward indication with the image data to be transferred to the or each third-party mobile entity whereby to indicate to the storage service a reward to be credited to a party associated with the third-party entity involved in the successful transfer of the image data to the storage service.

27. A mobile entity according to claim 26, wherein the transfer arrangement is arranged to negotiate said reward with the or each third-party mobile entity prior to image data transfer being effected.

28. A mobile entity according to claim 27, wherein the transfer arrangement is arranged to associate, in a subversion-resistant manner, with the image data to be transferred to the or each third-party mobile entity an identifier of a third party associated with the third-party entity concerned whereby to identify to the storage service the party to whom the reward should be credited for a successful transfer of the image data.

29. A mobile entity according to claim 19, wherein the transfer arrangement includes signing functionality for digitally signing at least the image data.

30. A mobile entity according to claim 29, wherein the transfer arrangement is arranged to transfer to the or each said third-party mobile entity, along with said image data, a third-party identifier identifying a party associated with the third-party mobile entity concerned, a reward indicator, and a digital signature generated by the signing functionality over a data set comprising the image data, the first-party identifier, the third-party identifier, and the reward indicator.

31. A mobile entity according to claim 19, wherein the mobile entity is arranged to normally operate in a first mode in which it is arranged to store the image data or transfer it itself to the storage service, but to change upon detection of low internal resources to a second mode in which the transfer arrangement is arranged to attempt to transfer image data to said at least one nearby third-party mobile entity.

32. A mobile entity according to claim 31, wherein the mobile entity is arranged in said first mode to store the image data in said memory but to change to said second mode upon the available space in said memory for storing image data falling below a predetermined level.

33. A mobile entity according to claim 31, further comprising a battery for powering the entity and communication means capable, at least at normal battery power levels, of communicating with the storage service over the communications infrastructure; the mobile entity being arranged to change from its first mode to its second mode upon the state of charge of its battery falling below a predetermined value.

34. A mobile entity according to claim 31, further comprising a battery for powering the entity and communication means capable, at least at normal battery power levels, of communicating with the storage service over the communications infrastructure; the mobile entity being arranged to change from its first mode to its second mode upon the simultaneous existence of a state of charge of its battery below a predetermined value and an availability of space in said memory for storing image data below a predetermined level.

35. A storage service system for receiving and storing image data for registered users, the system comprising:
   a communications interface for receiving from a sending party, over a communications infrastructure, image data and an associated first-party identifier identifying a first party different from said sending party;
   a checking arrangement arranged to check that said first party is a registered user of the service system and that the image data has not already been stored for the first party, the image data only being accepted for storage if both these checks are passed; and
   an image-data store for storing accepted image data for access by the first party.

36. A storage service system according to claim 35, further comprising a fragment-assembly arrangement for assembling together image fragments that have been separately received as image data via the communications interface and stored in the store for the same first party, this re-assembly being effected on the basis of fragment meta data received with each fragment image data.

37. A storage service system according to claim 35, further comprising a reward subsystem arranged to credit said sending party with a reward following the successful transfer and storage of image data received from that party.

38. A storage service system according to claim 37, wherein the reward subsystem is arranged to determine the reward to be credited on the basis of a reward indicator received with the image data, the checking arrangement being arranged to check that the reward indicator was associated with the image data by the first party.

39. A storage service system according to claim 35, further comprising a reward subsystem arranged to credit a third party with a reward following the successful transfer and storage of image data, the reward subsystem being arranged to determine the identity of the third party to be rewarded on the basis of a third-party identifier received with the image data concerned, and the checking arrangement being arranged to check that the third-party identifier was associated with the image data by the first party.

40. A storage service system according to claim 39, wherein the reward subsystem is arranged to determine the reward to be credited on the basis of a reward indicator received with the image data, the checking arrangement being arranged to check that the reward indicator was associated with the image data by the first party.

41. A storage service system according to claim 35, wherein a third-party identifier is associated with the image data and the checking arrangement is arranged to check both that the third-party identifier was associated with the image data by the first party and that the party identified by the third-party identifier is said sending party before accepting the image data for storage.

42. A storage service system according to claim 35, wherein a digital signature is associated with the received image data and the checking arrangement is arranged to check the authenticity of the image data using said digital signature.

43. A storage service system according to claim 35, wherein the communications interface is arranged to receive from said sending party, along with said image data and the first-party identifier, a third-party identifier, a reward indicator, and a digital signature over a data set comprising the image data, the first-party identifier, third-party identifier, and the reward indicator; the checking arrangement being arranged to carry out the following checks though not necessarily in the order given and with failure of a check potentially terminating the carrying out of the checks:
   a check, based on said digital signature, that the data set has not been altered,
   the said check that the party identified by the first-party identifier is registered with the service,
   a check that the sending party is the party identified by the third-party identifier,
   the said check that the image data in the data set has not already been received, the image store being arranged to store the image data upon all checks being passed, the service system further comprising a reward subsystem for crediting the sending party with the reward indicated by the reward indicator upon successful storage of the image data.

* * * * *